United States Patent
Sauder

(10) Patent No.: US 11,088,554 B2
(45) Date of Patent: Aug. 10, 2021

(54) IN-VEHICLE CHARGING STATION FOR AN ELECTRICALLY HEATED AEROSOL-GENERATING DEVICE

(71) Applicant: PHILIP MORRIS PRODUCTS S.A., Neuchatel (CH)

(72) Inventor: Markus Karl-Walter Sauder, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 185 days.

(21) Appl. No.: 16/471,757

(22) PCT Filed: Jan. 2, 2018

(86) PCT No.: PCT/EP2018/050046
§ 371 (c)(1),
(2) Date: Jun. 20, 2019

(87) PCT Pub. No.: WO2018/127484
PCT Pub. Date: Jul. 12, 2018

(65) Prior Publication Data
US 2020/0022407 A1     Jan. 23, 2020

(30) Foreign Application Priority Data
Jan. 3, 2017    (EP) .................................. 17150128

(51) Int. Cl.
*H01M 10/46*    (2006.01)
*H02J 7/00*    (2006.01)
(Continued)

(52) U.S. Cl.
CPC ............ *H02J 7/0044* (2013.01); *A24F 40/90* (2020.01); *H02J 7/0027* (2013.01); *A24F 40/20* (2020.01)

(58) Field of Classification Search
CPC ...... H02J 7/0042; H02J 7/0045; H02J 7/0044; A24F 42/60; A24F 40/90; A24F 40/95; A24F 40/20
(Continued)

(56) References Cited

U.S. PATENT DOCUMENTS 9,357,802 B2    6/2016    Liu
10,555,555 B2 *    2/2020    Fernando ................. A24F 40/50
(Continued)

FOREIGN PATENT DOCUMENTS

CN    2143568    10/1993
CN    203554013    4/2014
(Continued)

OTHER PUBLICATIONS

PCT Search Report and Written Opinion for PCT/EP2018050046 dated Feb. 6, 2018 (14 pages).
(Continued)

*Primary Examiner* — Edward Tso
(74) *Attorney, Agent, or Firm* — Mueting Raasch Group

(57) ABSTRACT

A charging station for an electrically heated aerosol-generating device which is adapted for stationary arrangement in a vehicle. The charging station includes a docking port for removably receiving the aerosol-generating device and a charging circuit operatively connectable to the aerosol-generating device when being received in the docking port for charging an electrical power supply of the aerosol-generating device. The charging station further includes a releasable retaining device configured for securely retaining the aerosol-generating device in the docking port such as to allow for one-handed removing of an aerosol-forming substrate from the aerosol-generating device. A charging assembly includes an electrically heated aerosol-generating device
(Continued)

Figure 1:
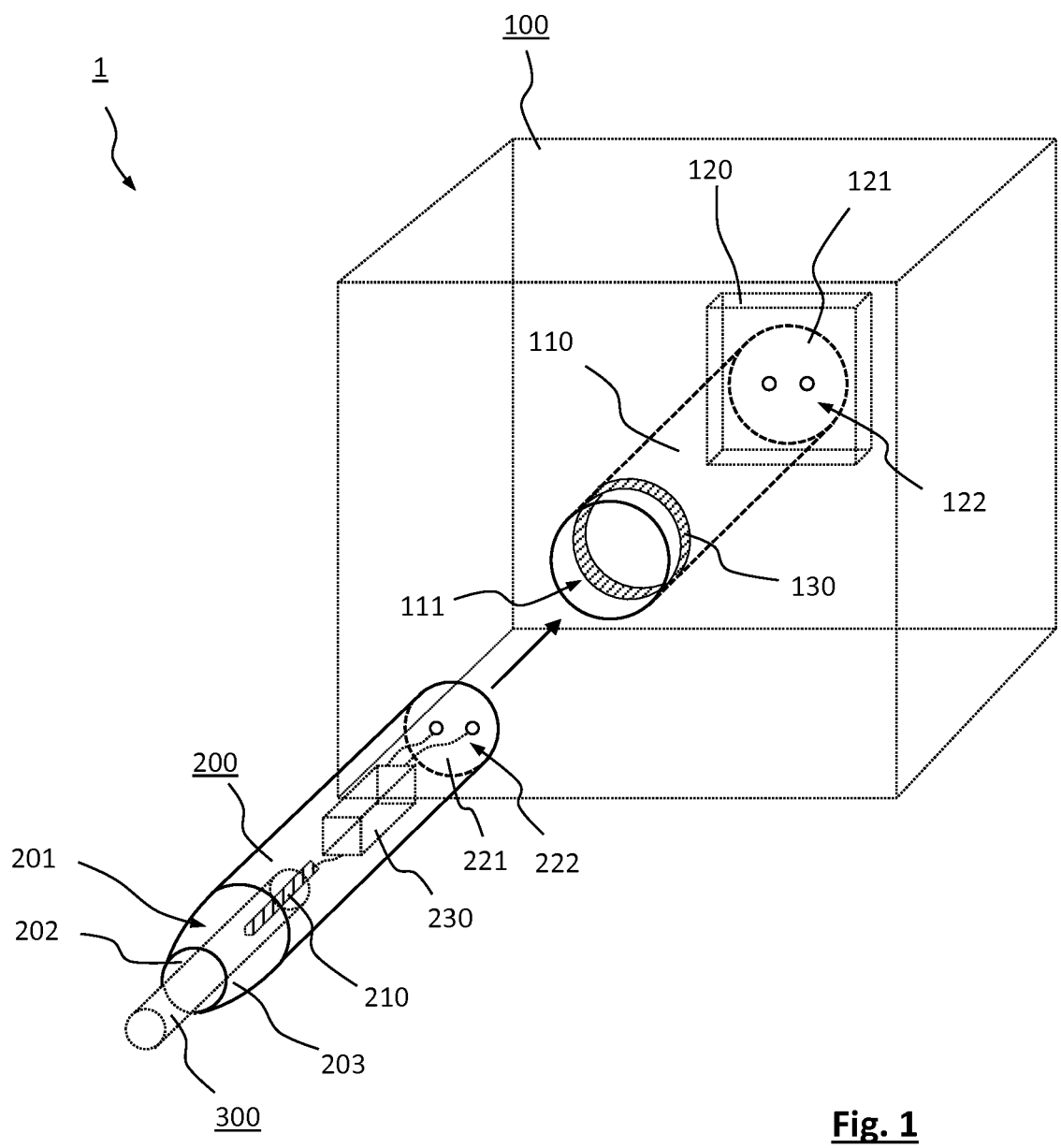

and a charging station. A vehicle may include a charging station being stationarily arranged in the vehicle.

16 Claims, 3 Drawing Sheets

(51) Int. Cl.
    *A24F 40/90*     (2020.01)
    *A24F 40/20*     (2020.01)

(58) Field of Classification Search
    USPC ................. 320/104, 107, 114, 115; 131/273
    See application file for complete search history.

(56) References Cited

U.S. PATENT DOCUMENTS

| | | | | |
|---|---|---|---|---|
| 2005/0011883 | A1* | 1/2005 | Clothier | F28D 20/0056 219/618 |
| 2014/0353185 | A1 | 12/2014 | Liu | |
| 2015/0020831 | A1 | 1/2015 | Weigensberg | |
| 2015/0189916 | A1 | 7/2015 | Wu | |
| 2016/0286857 | A1 | 10/2016 | Liu | |
| 2018/0043114 | A1* | 2/2018 | Bowen | A61M 15/003 |

FOREIGN PATENT DOCUMENTS

| | | |
|---|---|---|
| CN | 204858653 | 12/2015 |
| JP | U3171342 | 10/2011 |
| KR | 101232619 | 2/2013 |
| RU | 2014129586 | 2/2016 |
| RU | 2590876 | 7/2016 |
| WO | WO 2010/133342 | 11/2010 |
| WO | WO 2013/076098 | 5/2013 |

OTHER PUBLICATIONS

Office Action issued in Russia for Application No. 2019124184 dated Mar. 24, 2021 (4 pages). English translation included.

* cited by examiner

IN-VEHICLE CHARGING STATION FOR AN ELECTRICALLY HEATED AEROSOL-GENERATING DEVICE

This application is a U.S. National Stage Application of International Application No. PCT/EP2018/050046 filed Jan. 2, 2018, which was published in English on Jul. 12, 2018, as International Publication No. WO 2018/127484 A1. International Application No. PCT/EP2018/050046 claims priority to European Application No. 17150128.1 filed Jan. 3, 2017.

The present invention relates to a charging station for charging an electrical power supply of an electrically heated aerosol-generating device.

Electrically heated aerosol-generating devices as referred to herein—typically comprise an electrical heater for heating an aerosol-forming substrate to form an inhalable aerosol of a substance evaporated from the substrate upon heating. The aerosol-forming substrate may be part of an aerosol-generating article to be received within the aerosol-generating device. The electrical heater may be powered from a battery or any other kind of electrical power supply integrated in the aerosol-generating device. Due to the finite charging capacity, it is necessary to recharge the power supply from time to time. For this, the aerosol-generating device may be operatively connected to an electrical charging device. Yet, most of these charging devices may only be operated by two hands, one hand for holding the charging device or at least parts thereof, the other hand for guiding and connecting the aerosol-generating device to the charging device. Furthermore, in some cases, a lid of the charging device has to be closed for the charging process to start. Likewise, replacing the aerosol-forming substrate or aerosol-generating article also requires two-handed operation, one hand for holding the aerosol-generating device, the other hand for removing used up substrate and for subsequently inserting fresh substrate into the aerosol-generating device. However, in many situations such two-handed operation is often impractical for users, for example while driving a car.

Therefore, it would be desirable to have a charging station with improved operation comfort. In particular, it would be desirable to have a charging station allowing for operatively connecting and disconnecting an aerosol-generating device to the charging station by one hand only and moreover allowing for one-handed replacement of an aerosol-forming substrate or aerosol-generating article received or to be received in the aerosol-generating device.

According to the invention there is provided a charging station for an electrically heated aerosol-generating device which comprises a docking port for removably receiving the aerosol-generating device. The charging station further comprises a charging circuit operatively connectable to the aerosol-generating device when being received in the docking port for charging an electrical power supply of the aerosol-generating device.

Preferably, the electrical power supply comprises at least one rechargeable battery such as a lithium ion battery or a lithium polymer battery. Alternatively or in addition, the electrical power supply may comprise an energy storage capacitor, in particular a high-capacity energy storage capacitor.

The docking port may be adapted to the dimensions of the aerosol-generating device to be received therein. Preferably, the docking port comprises one of the following configurations: a compartment, a slot, a socket, a sleeve or a recess.

In order to operatively connect the aerosol-generating device to the charging circuit, the charging circuit may comprise an electrical connector for receiving a corresponding connector of the aerosol-generating device when being received in the docking port. The connector of the charging circuit may comprise at least two, preferably five electrical contact elements to get into contact with corresponding electrical contact elements of the aerosol-generating device. Preferably, the contact elements of the charging circuit are configured such as to get automatically into operative contact with the contact elements of the corresponding connector of the aerosol-generating device when the aerosol-generating device is fully received in the docking port. In particular, the connector of the charging circuit or the connector of the aerosol-generating device or both connectors may comprise resilient contact elements to ensure secured contact between the charging circuit and the aerosol-generating device.

Alternatively, the charging circuit may be configured for contactless, in particular inductive charging of the aerosol-generating device. In this case, the aerosol-generating device is respectively configured for contactless, in particular inductive charging.

The charging circuit may comprise an internal power supply for charging the electrical power supply of the aerosol-generating device. Alternatively or in addition, the charging station may be connectable to an external power supply in order to be externally supplied with electrical power for charging the electrical power supply of the aerosol-generating device. Advantageously, the charging circuit may comprise a combination of both, an internal power supply and a connector to an external power supply. Preferably, the connectability to an external power supply may be used for supplying the internal power supply with electrical power, in particular for charging the internal power supply. Vice versa, the internal power supply may be used as an auxiliary energy buffer in case the charging circuit is temporarily disconnected from the external power supply or in case the external power supply is temporarily unavailable.

With regard to the external power supply, the charging station may be operatively connectable to any electrical system at the user's site. This may be a home power network or an electrical system of a vehicle, especially a power supply of a vehicle. For this, the charging station may comprise a connector for connecting the charging circuit to a domestic socket or to a power supply of a vehicle. For example, the charging station may comprise a connector cable having a domestic power plug, a cigarette lighter connector or a USB (Universal Serial Bus) connector for connecting the charging circuit to a domestic socket, a cigarette lighter socket or a USB socket. Alternatively, the charging station may be hard-wired to a home power network or an electrical system of a vehicle, especially to the power supply of a vehicle.

The charging circuit may be configured only for providing electrical power from an internal or external power supply to the aerosol-generating device, preferably without controlling the charging process. In that case, the aerosol-generating device itself may be configured for controlling the charging of its power supply. However, the charging circuit may also be configured for controlling the charging of the power supply of the aerosol-generating device. For this, the charging circuit may comprise a controller.

According to the invention, the charging station is adapted for stationary arrangement at a user's site in order to allow for operatively connecting and disconnecting an aerosol-generating device to and from the charging station using one hand only. In particular, the charging station is adapted for stationary arrangement at a user's home or in a vehicle.

Preferably, the charging station is an in-vehicle charging station. The vehicle may be for example a car, a train, an aircraft, a bus, a coach or a boat. Preferably, the charging station is adapted for stationary arrangement in a dashboard, a center console, an arm-rest, an ashtray recess, a change-tray recess or a cup-holder recess of a vehicle. In particular with regard to a stationary arrangement in vehicles, one-handed operability provides large operational convenience and significant safety benefits. For example, a car driver may easily connect and disconnect an aerosol-generating device to and from the charging station using one hand while still being capable of driving the car with the other hand.

The term "stationary arrangement" as used herein refers to an arrangement of the charging station in which at least the docking port and the charging circuit are secured against displacement relative to the user's site during insertion or removal of the aerosol-generating device into or from the docking port.

For this, the charging station may be configured such that its self-weight exceeds a typical force to be absorbed by the charging station due to inserting or removing the aerosol-generating device into or from the docking port. In addition, the charging station may comprise frictional contact elements for providing static friction fit to the user's site. For example, the frictional contact elements may provide static friction fit to a surface of an object at the user's site on which the charging station is to be placed, such as a desk panel.

Preferably, the charging station is or is adapted for being securely connected at the user's site, for example by clamping, screwing, riveting, gluing or a combination thereof. The charging station may comprise a mounting base, a mounting frame or a housing adapted for stationary installation in a corresponding mounting recess at the user's site.

As an example, the charging station may be adapted for stationary arrangement or is stationary arranged in a vehicle, for example in a dashboard, a center console, an arm-rest, an ashtray recess, a change-tray recess or a cup-holder recess of a car. For this, the charging station may comprise a corresponding mounting base, mounting frame or housing that is adapted for stationary installation in at least one of the above mentioned recesses.

In general, the aerosol-generating device may comprise a recess or cavity for receiving an aerosol-forming substrate or for receiving an aerosol-generating article including an aerosol-forming substrate.

The aerosol-generating device may further comprise an electrical heater for heating the aerosol-forming substrate. In particular, the electrical heater may include a resistive heater or an inductive heater. The heater may be further configured for penetrating an internal portion of the aerosol-forming substrate or aerosol-generating article when being received in the recess or cavity of the aerosol-generating device.

As used herein, the term "aerosol-forming substrate" relates to a substrate capable of releasing volatile compounds that can form an aerosol upon heating the aerosol-forming substrate. The aerosol-forming substrate may conveniently be part of an aerosol-generating article. The aerosol-forming substrate may be a solid aerosol-forming substrate. The aerosol-forming substrate may comprise a tobacco-containing material containing volatile tobacco flavour compounds, which are released from the substrate upon heating. Alternatively or additionally, the aerosol-forming substrate may comprise a non-tobacco material. The aerosol-forming substrate may further comprise an aerosol former. Examples of suitable aerosol formers are glycerine and propylene glycol. The aerosol-forming substrate may also comprise other additives and ingredients, such as nicotine or flavourants. The aerosol-forming substrate may also be a paste-like material, a sachet of porous material comprising aerosol-forming substrate, or, for example, loose tobacco mixed with a gelling agent or sticky agent, which could include a common aerosol former such as glycerine, and which is compressed or molded into a plug.

For removing the aerosol-forming substrate or aerosol-generating article after having been used up, the aerosol-forming substrate or aerosol-generating article may be just retracted by hand from the recess or cavity of the aerosol-generating device, in particular from the penetrating heating element, where present. Alternatively, the aerosol-generating device may also comprise an extractor—for example as described in WO 2013/076098 A2—for extracting the aerosol-forming substrate or aerosol-generating article received in the aerosol-generating device.

In any case, removing the aerosol-forming substrate or aerosol-generating article from the aerosol-generating device requires a specific removing force, mainly for overcoming the frictional resistance between the aerosol-generating device and the aerosol-forming substrate or aerosol-generating article. Likewise, inserting an aerosol-forming substrate or aerosol-generating article into the aerosol-generating device requires a specific insertion force. In normal two-handed operation, the corresponding removing or insertion force is exerted by the one hand onto the aerosol-forming substrate or aerosol-generating article, while the corresponding counter force subjected to the aerosol-generating device is absorbed by the other hand holding the aerosol-generating device.

In contrast to this, the charging station according to the present invention allows at least for one-handed removal of an aerosol-forming substrate or aerosol-generating article from the aerosol-generating device. This is another major advantage with regard to the operational convenience and safety benefits of the charging station, in particular when being stationary arranged in a vehicle. To allow for this kind of one-handed operability, the charging station comprises a releasable retaining device configured for securely retaining the aerosol-generating device in the docking port at least against a force required to remove an aerosol-forming substrate or aerosol-generating article from the aerosol-generating device. Hence, instead of a second hand, it is the retaining device which is configured to absorb at least a corresponding counter force subjected to the aerosol-generating device when an aerosol-forming substrate or aerosol-generating article is to be removed from the aerosol-generating device. In other words, the retaining device is configured to absorb a removing force for removing the aerosol-forming substrate or aerosol-generating article from the aerosol-generating device. Vice versa, the retaining device is configured to exert a retaining force on the aerosol-generating device that is directed opposite to and at least equal to or even larger than a removing force required for removing an aerosol-forming substrate or aerosol-generating article from the aerosol-generating device. In particular, the retaining device is configured for securely retaining the aerosol-generating device in a fixed charging position with regard to the charging circuit.

In addition, the retaining device may be configured for securely holding the aerosol-generating device in the docking port, in particular in the charging position, against a force required to insert an aerosol-forming substrate or aerosol-generating article into the aerosol-generating device. This allows in addition for one-handed insertion of an aerosol-forming substrate or aerosol-generating article into the aerosol-generating device. Accordingly, the retaining device may be configured to absorb an inserting force for inserting an aerosol-forming substrate or aerosol-generating article into the aerosol-generating device. Vice versa, the retaining device is configured to exert a retaining force on the aerosol-generating device that is directed opposite to and at least equal to or even larger than an inserting force required for inserting an aerosol-forming substrate or aerosol-generating article into the aerosol-generating device.

The retaining device may be configured to securely retain the aerosol-generating device in the docking port against a force of at least 0.5N, in particular of at least 1 N, preferably of at least 2 N, most preferably of at least 3 N, subjected to the aerosol-generating device at least in a direction of removal from the docking port. This force is larger than typical forces required for removing an aerosol-forming substrate or aerosol-generating article from the aerosol-generating device. In addition, the retaining device may be configured to securely retain the aerosol-generating device in the docking port against a force of at least 0.5 N, in particular of at least 1 N, preferably of at least 2 N, most preferably of at least 3 N, subjected to the aerosol-generating device at least in a direction of insertion into the docking port.

The direction of inserting and removing the aerosol-generating device into and from the docking port may be parallel to the direction of inserting and removing an aerosol-forming substrate or aerosol-generating article into and from the aerosol-generating device. Yet, depending on the configuration of the docking port and the aerosol-generating device, the direction of inserting and removing the aerosol-generating device into and from the docking port may be different from, in particular transverse to the direction of inserting and removing an aerosol-forming substrate or aerosol-generating article into and from the aerosol-generating device.

In general, the retaining device may be configured for securely retaining the aerosol-generating device in the docking port, in particular the charging position, in a form-fitting or force-fitting or force- and form fitting manner.

As an example, the retaining device may comprise clamping means or friction means configured for exerting a clamping force or a friction force on the aerosol-generating device that is directed opposite to and at least equal to or even larger than a removing force for removing an aerosol-forming substrate or aerosol-generating article from the aerosol-generating device. The clamping means or friction means may additionally be configured for exerting a clamping force or a friction force on the aerosol-generating device which is directed opposite to and at least equal to or even larger than an inserting force for inserting an aerosol-forming substrate or aerosol-generating article into the aerosol-generating device.

With regard to a form fit, the retaining device may comprise a recess or a protrusion configured for engagement with the aerosol-generating device when being received in the docking port. For this, the aerosol-generating device may comprise a corresponding protrusion or recess, respectively, for engagement with the recess or protrusion of the retaining device.

According to the invention, the retaining device is releasable. The releasability may be given due to a finite value of the retaining force exerted by the retaining device on the aerosol-generating device such that the aerosol-generating device can be freely removed or inserted from or into the docking port by exerting a removing or inserting force on the aerosol-generating device that exceeds the finite retaining force. For example, a removing or an inserting force subjected to the aerosol-generating device may exceed a frictional force retaining the aerosol-generating device in the docking port.

Alternatively or additionally, the charging station may also comprise a release mechanism for releasing the retaining device. As an example, the release mechanism may comprise a mechanism to retract a protrusion in order to get disengaged from a corresponding recess in the aerosol-generating device to free passageway for removing or inserting the aerosol-generating device form or into the docking port.

For assisting the removal of the aerosol-generating device from the docking port, the charging station may further comprise an ejection mechanism. For example, the ejection mechanism may comprise a spring configured to get loaded upon inserting the aerosol-generating device into the docking port and to release its load onto the aerosol-generating device upon removing the same. Preferably, the ejection mechanism may be coupled to the release mechanism. As an example, the ejection mechanism may be configured such as to get activated upon inserting an aerosol-forming substrate or aerosol-generating article into the aerosol-generating device when being received in the docking port.

The releasable retaining device may comprise at least one of a push-pull lock, a push-push lock, a bayonet lock, a snap lock, a torsion snap lock, a magnetic lock, an electromagnetic lock, a clamping lock or a gripping lock.

Push-pull locks are known from plug connectors. The locking mechanism of a push-pull lock allows for easy engagement of the aerosol-generating device by pushing it into the lock and for easy disengagement by pulling it in the opposite direction. For de-locking, that is for releasing the aerosol-generating device from the locked position, the pulling force to be subjected to the aerosol-generating device must exceed a retaining force of the push-pull lock which is chosen larger than the force required for removing an aerosol-forming substrate or aerosol-generating article from the aerosol-generating device. In the opposite direction, that is in the direction of inserting the aerosol-generating device into the docking port, the push-pull lock may comprise an end stop limiting the inserting path and thus providing a well-defined charging position of the aerosol-generating device when being received in the docking port.

Push-push locks are known for example from furniture locks or from electrical push switches. In contrast to push-pull locks, push-push locks are locked and de-locked by pushing one of the locking partners towards the other locking partner. In the opposite direction, that is in a direction of moving the locking partners apart, the push-push lock is blocked in the locked state. Therefore, push-push locks are especially suitable for securely retaining the aerosol-generating device in the docking port as they allow for one-handed removing of an aerosol-forming substrate from the aerosol-generating device.

The retaining device may include a bayonet lock comprising a cylindrical male side and a female receptor. The male side comprises at least one radial pin, whereas the female receptor comprises at least one matching L-shaped slot and at least one spring to keep the male and female parts locked together. Preferably, the female receptor is allocated at the aerosol-generating device and the male counterpart at the charging station. Of course, the male counterpart may also be allocated at the aerosol-generating device and the female receptor at the charging station. In the locked state, the two locking parts are no longer free to rotate unless pushed together against the spring until the pin is out of the short segment of the L-shaped slot.

The retaining device may comprise a magnetic lock. For example, the retaining device may comprise one or more permanent magnets for attractive interacting with one or more corresponding magnetic elements of the aerosol-generating device when being received in the docking. The aerosol-generating device may comprise a ferromagnetic material as magnetic element. Likewise, metallic parts of an electric connector of the aerosol-generating device used for operatively connecting the aerosol-generating device to the charging circuit may serve as magnetic element to be attracted by the permanent magnet. Of course, it is also possible that the aerosol-generating device comprises one or more permanent magnets for attractive interacting with one or more corresponding magnetic elements of the charging station. The magnetic lock is preferably configured such that on the one hand a magnetic attraction between the permanent magnet and the magnetic element keeps the aerosol-generating device in the docking force against a force required for removing an aerosol-forming substrate or aerosol-generating article from the aerosol-generating device. On the other hand, the magnetic lock is preferably configured such that the magnetic attraction is limited and, thus, may be overcome by subjecting a moderate pulling force to the aerosol-generating device for removing the aerosol-generating device from the docking port. Due to this, the magnetic lock is releasable.

As alternative to permanent magnets, the retaining device may also comprise at least one electromagnet or solenoid for realizing an electro-magnetic lock. By running a current through the electromagnet or solenoid, a magnetic field builds up which may attractively interact with one or more corresponding magnetic elements or permanent magnets of the aerosol-generating device when being received in the docking. Electro-magnetic locks advantageously allow for controlling the retaining force by controlling the current running through the electromagnet or solenoid. Even more, electro-magnetic locks may be easily switched on and off and thus may be easily released. The charging station may comprise a manually operable control switch for switching the magnetic field of the electro-magnet or solenoid on and off. The electrical power needed to drive the electromagnet or solenoid may be provided by an internal power supply of the charging station, in particular by an internal power supply of the charging circuit. Likewise, the electrical power may be provided by an external power supply to which the charging station is operatively connectable, as described above with regard to the charging circuit. The electro-magnetic lock may even provide an ejection mechanism by reversing the polarity of the electromagnet or solenoid, thereby turning the attractive force on the aerosol-generating device into a repellant force. The polarity of the electro-magnet or solenoid may be easily reversed by reversing the direction of a current running therethrough.

Most preferably, the retaining device may comprise a gripping lock, in particular based upon frictional fit. For example, the retaining device may comprise at least one gripping element. The gripping element may be formed from a resilient polymeric material, for example an elastomer. The gripping element may be arranged in the docking port such as to get into frictional fit with the aerosol-generating device, for example with a portion of an outer surface of the aerosol-generating device, when being received in the docking port. The gripping element may be configured such as to keep the aerosol-generating device in the docking port against a force required for removing an aerosol-forming substrate or aerosol-generating article from the aerosol-generating device. For this, the frictional force between the gripping element and the aerosol-generating device is such as to be equal or larger than a force required for removing an aerosol-forming substrate or aerosol-generating article from the aerosol-generating device.

For example, the gripping element may be an annular band or ring, for example an O-ring, arranged at the inner surface of a cylindrical docking port which closely fits to at least a portion of an outer surface of the aerosol-generating device when being received in the docking port.

The retaining device may also comprise a plurality of gripping elements. For example, the retaining device may comprise a plurality nips made of resilient polymeric material. The nips are configured to get into frictional fit with the aerosol-generating device upon inserting the aerosol-generating device into the docking port. In general, the quantity and size of the gripping elements may be selected such as to achieve a defined retaining force.

The retaining device may comprise a clamping lock including at least one clamping element or clamping means configured for exerting a clamping force to the aerosol-generating device when being received in the docking port. The clamping force is configured such as to retain the aerosol-generating device in the docking station against a force required for removing an aerosol-forming substrate or aerosol-generating article from the aerosol-generating device. As an example, the retaining device may comprise a spring-loaded clamp configured to engage with aerosol-generating device when being received in the docking port.

The retaining device may be integral to at least a part of the docking port or the charging circuit. For example, the docking port may comprise at least one clamp as retaining device for receiving and releasably holding an aerosol-generating device. The clamp is in one piece with the docking port or which constitutes a docking port and a retaining device in one. As another example, the docking port may comprise a sleeve or recess for receiving at least a portion of the aerosol-generating device therein. The sleeve or recess may be made of an elastic material such as to reversibly expand upon inserting the aerosol-generating device, thereby exerting a clamping force to the aerosol-generating device. As yet another example, an electrical connector of the charging circuit connectable to the aerosol-generating device may be configured such as to receive and releasably engage with a corresponding connector of the aerosol-generating device in a clamping manner. The clamping is such as to keep the aerosol-generating device in the docking port against a force required for removing an aerosol-forming substrate or aerosol-generating article from the aerosol-generating device. The electrical connector may be configured as clamping connector, such as a clamping connector having spring-loaded clamping contacts or elastic parts of a connector plug.

In order to further improve the operation comfort, in particular to improve the one-handed operability of the charging station and the aerosol-generating device, the charging circuit may be configured for activating a (pre-)heating process of the electrically heated aerosol-generating device upon removal of the aerosol-generating device from the docking port. Activating a (pre-)heating process causes a heater in the aerosol-generating device to start (pre-)heating the aerosol-forming substrate or aerosol-generating article.

For this, the charging station may comprise a mechanical contact element which is configured to activate a button on the aerosol generating device upon removal from the docking port. The button on the aerosol-generating device may be actually designed for activating the (pre-)heating process in normal operation directly at the device, for example by pressing the button with a finger. Advantageously, the mechanical contact element supersedes pressing the button with a finger. This further improves the one-handed operability of the charging station and the aerosol-generating device. As an example, the mechanical contact element may be a protrusion at an inner wall of the docking port which temporarily engages with the button on the aerosol-generating device upon removal from the docking port.

Alternatively, the charging circuit may comprise a controller, for example a micro-controller that may be also used for controlling the charging of the aerosol-generating device. Due to this, a user of the aerosol-generating device advantageously does not need to separately push a button at the aerosol-generating device for activating a (pre-)heating cycle.

The charging station, in particular the charging circuit, especially the controller of the charging circuit, may comprise a detector configured to indicate the removal of the aerosol-generating device from the docking port. The detector may be an optical, inductive, contact or current detector capable of detecting the aerosol-generating device changing from a charging position to a non-charging position. As an example, the detector may detect a change of the charging current in the charging circuit, in particular a break-down or a change of the charging current from a load to an off-load mode.

The charging circuit, especially the controller of the charging circuit, may be further configured to generate and transfer an activation signal to the aerosol-generating device for activating the (pre-)heating process. The charging circuit may be configured for wireless transfer of the activation signal. Likewise, the charging circuit may be configured for wire-based transfer of the activation signal, for example via the connectors of the charging circuit and the aerosol-generating device. The connectors may be configured such as to have at least one connection for transferring the activation signal being disconnected later than a connection used for transferring a charging current from the charging circuit to the aerosol-generating device when the aerosol-generating device is removed from the docking port.

Vice versa, the aerosol-generating device may also be configured to automatically activate a heating process upon being removed from the docking port, for example by detecting a break-down of a charging current.

The aerosol-generating device itself may also be configured for controlling the charging of its power supply. In that case, the charging circuit may be configured only for providing electrical power from an internal or external power supply to the aerosol-generating device.

According to the invention there is also provided a charging assembly comprising a charging station according to invention and as described herein as well as an electrically heated aerosol-generating device according to invention and as described herein. The aerosol-generating device is configured for receiving an aerosol-forming substrate or aerosol-generating article. The aerosol-generating device further comprises an electrical heater for heating the aerosol-forming substrate or aerosol-generating article to form an aerosol. The aerosol-generating device also includes an electrical power supply for supplying electrical power to the electrical heater.

Further features and advantages of the charging assembly according to the invention have been described with regard to charging station and the aerosol-generating device and will not be repeated.

According to the invention there is also provided a vehicle comprising a charging station or a charging assembly according to the invention and as described herein, wherein the charging station is stationary arranged in the vehicle. The vehicle may be a car, a train, an aircraft, a bus, a coach or a boat.

Preferably, the charging station is stationary arranged in a dashboard, a center console, an arm-rest, an ashtray recess, a change-tray recess or a cup-holder recess of the vehicle.

Further features and advantages of the vehicle according to the invention have been described with regard to charging station, the aerosol-generating device and the charging assembly and will not be repeated.

Figure 2:
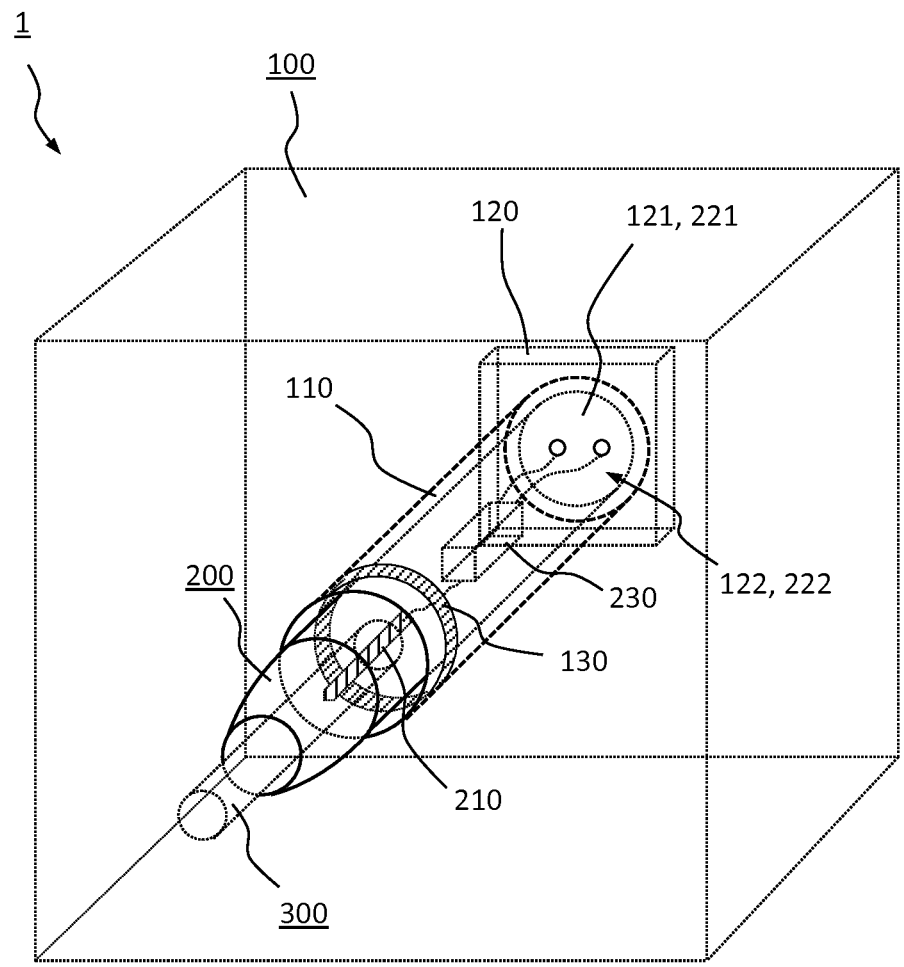
Figure 3:
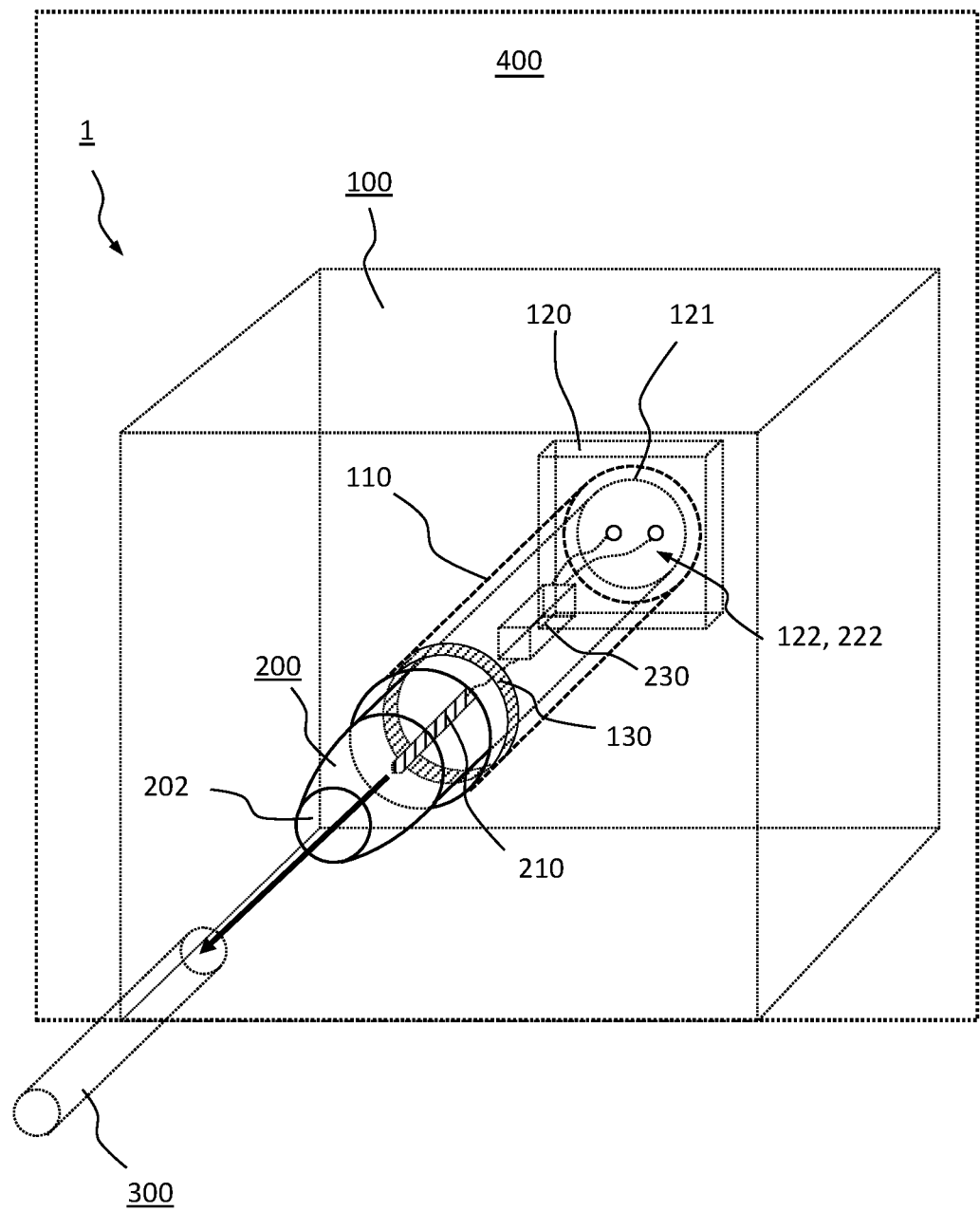

The invention will be further described, by way of example only, with reference to the accompanying drawings, in which:

FIG. 1 schematically shows an exemplary embodiment of a charging assembly according to the invention, comprising a charging station and an aerosol-generating device to be received in the charging station;

FIG. 2 schematically shows the charging assembly according to FIG. 1, with the aerosol-generating device being received in the charging station; and FIG. 3 schematically shows the charging assembly according to FIG. 2, wherein an aerosol-generating article is removed from the aerosol-generating device.

FIGS. 1 to 3 schematically illustrate an exemplary embodiment of a charging assembly 1 according to the present invention. The charging assembly 1 comprises a charging station 100 and an electrically heated aerosol-generating device 200 to be received (FIG. 1) or being received (FIGS. 2 and 3) in a docking port 110 of the charging station 100. According to the invention, the charging station 100 is adapted for stationary arrangement at a user's site in order to allow for operatively connecting and disconnecting the aerosol-generating device 200 to and from the charging station 100 using one hand only. Preferably, the charging station 100 is adapted for stationary arrangement in a vehicle 400, for example in a dashboard, a center console, an arm-rest, an ashtray recess, a change-tray recess or a cup-holder recess of a vehicle.

The charging station 100 comprises a charging circuit 120 that is operatively connectable (FIG. 1) or connected (FIG. 2 and FIG. 3) to the aerosol-generating device 200 when being received in the docking port 110. The charging circuit 120 is configured for providing electrical power to an electrical power supply 230 of the aerosol-generating device 200. In the present embodiment, this is a battery 230.

Preferably, the charging station 100, in particular the charging circuit 120, is powered from an external power supply at the user's site, such as from a battery of a vehicle (not shown). For this, the charging station 100 may comprise a connector (not shown) for connection the charging circuit 120 to the external power supply.

The battery 230 is operatively connected to an electrical heater 210 of the aerosol-generating device 200 which is configured for heating an aerosol-forming substrate of an aerosol-generating article 300 to form an inhalable aerosol of a substance evaporated from the substrate upon heating.

In the present embodiment, the electrical heater 210 comprises a blade and at least one resistive heating element attached thereto. The resistive heating element is configured for generating heat, when an electrical current runs therethrough. The current is supplied from the battery 230.

For controlling the heating process and preferably also the charging process, the aerosol-generating device 200 may include a controller (not shown) which is operatively connected to the battery 230 and the heater 210.

The aerosol-generating device 200 comprises a cylindrical cavity 201 for receiving an aerosol-generating article 300 through an opening 202 at a distal end 203 of the aerosol-generating device 200. Opposite to the opening 202, the heater 210 extends into the cavity 201 such as to penetrate into the aerosol-forming substrate of the aerosol-generating article 300 when it is inserted into the cavity 201. The aerosol-forming substrate is thereby heated from the inside.

After use, the aerosol-generating article 300 may be removed from the aerosol-generating device 200 by retracting the aerosol-generating article 300 from the heater 210. The removal of the aerosol-generating article 300 typically requires a certain removing force due to friction and adhesion between the material of the aerosol-generating article 300 and the heater 210. Therefore, a designated extractor (not shown), which forms part of the aerosol-generating device 200, is preferably used to remove the aerosol generating article 300 out of contact with the heater 210.

For electrically (re-)charging the battery 230 of the aerosol-generating device 200, the aerosol-generating device 200 is inserted into a slot of the docking port 110 via an insertion opening 111 at the front of the charging station 100. The cross-section of the slot and the insertion opening 111 is only slightly larger than the cross-section of the aerosol-generating device 200. Hereby the aerosol generating device 200 is laterally guided while being inserted into the docking port 110. The insertion depth of the slot is smaller than the total length extension of the aerosol-generating device 200. A distal portion of the aerosol-generating device 200 protrudes from the front of the charging station 100 when it has been fully inserted in the docking port 110. The protruding distal portion of the aerosol-generating device 200 allows a user for easy taking hold of the aerosol-generating device 200 with the fingers of one hand.

At the bottom end 121 of the slot, the charging circuit 120 comprises an electrical connector 122 having at least two electrical contacts that are automatically connected to contacts of a corresponding connector 222 at the proximal end 221 of the aerosol-generating device 200 when being fully received in the docking port 110. The automatic connectability of the aerosol-generating device 200 to the charging circuit 120 further simplifies the handling of the charging assembly 1. FIG. 2 and FIG. 3 show aerosol-generating device 200 in the charging position.

In order to allow for a one-handed removal of the aerosol-generating article 300 from the aerosol-generating device 200, the charging station 100 comprises a retaining device 130. In the present embodiment, the retaining device 130 comprises an annular, band-like gripping element made of an elastomer, for example rubber. The gripping element is attached at the inner surface of the cylindrical slot of the docking port 110 such as to circumferentially get into contact with an annular portion of the outer surface of the aerosol-generating device 200 when said aerosol-generating device is being received in the docking port 110. Due to the frictional resistance of the elastomer being in close surface contact with the aerosol-generating device 200, the retaining device 130 is in frictional fit with the aerosol-generating device 200. The material and the size of the retaining device is selected such as to achieve a defined frictional retaining force that exceeds the above mentioned removing force required for removing an aerosol-forming article 300 from the aerosol-generating device 200. Due to this, the aerosol-generating device 200 remains in the docking port 110 allowing for removal of the aerosol-generating article 300 using one hand only.

In order to further improve the user comfort, the charging station 100 according to the present embodiment is configured so as to automatically activate a heating process of the aerosol-generating device 200 upon removal of the aerosol-generating device 200 from the docking port 110. For this, the inner wall of the slot of the docking port 110 may comprise a protrusion (not shown) which temporarily engages with an activation button (not shown) on the aerosol-generating device upon removal from the docking port 110. The activation button is designed for activating the (pre-) heating process in normal operation directly at the device, for example by pressing the button with a finger.

Alternatively, the charging station 100 may comprise a detector which is configured to indicate the removal of the aerosol-generating device 200 from the docking port 110.

The invention claimed is:

1. An in-vehicle charging station for an electrically heated aerosol-generating device, the in-vehicle charging station being configured for stationary arrangement at a site of use in a vehicle and comprising:
   a docking port for removably receiving the aerosol-generating device;
   a charging circuit operatively connectable to the aerosol-generating device when being received in the docking port for charging an electrical power supply of the aerosol-generating device; and
   a housing adapted for securing at least the docking port and the charging circuit against displacement, relative to the site of use in the vehicle, during insertion or removal of the aerosol-generating device into or from the docking port,
   wherein the in-vehicle charging station further comprises a releasable retaining device configured for securely retaining the aerosol-generating device in the docking port such as to allow for one-handed removing of an aerosol-generating article from the aerosol-generating device.

2. The charging station according to claim 1, wherein the retaining device is configured for securely retaining the aerosol-generating device in the docking port in a form-fitting or force-fitting or force- and form-fitting manner.

3. The charging station according to claim 1, further comprising a release mechanism for releasing the retaining device.

4. The charging station according to claim 1, further comprising an ejection mechanism for assisting the removal of the aerosol-generating device from the docking port.

5. The charging station according to claim 1, wherein the retaining device comprises at least one of a push-pull lock, a push-push lock, a bayonet lock, a snap lock, a torsion snap lock, a magnetic lock, an electromagnetic lock, a clamping lock or a gripping lock.

6. The charging station according to claim 1, wherein the retaining device is configured to securely retain the aerosol-generating device in the docking port against a force of at least 0.5 N subjected to the aerosol-generating device in a direction of removal from the docking port.

7. The charging station according to claim 1, wherein the charging circuit is configured for activating a heating process of the aerosol-generating device upon removal of the aerosol-generating device from the docking port.

8. The charging station according to claim 7, wherein the charging station comprises a detector configured to indicate the removal of the aerosol-generating device from the docking port.

9. The charging station according to claim 1, wherein the docking port comprises one of a compartment, a slot, a socket, a sleeve or a recess.

10. The charging station according to claim 1, wherein the retaining device is integral to at least a part of the docking port or of the charging circuit.

11. The charging station according to claim 1, wherein the charging circuit comprises an electrical connector for receiving a corresponding connector of the aerosol-generating device when being received in the docking port.

12. The charging station according to claim 1, wherein the charging circuit is operatively connectable to a power supply at the site, where it is to be stationary arranged at.

13. A charging assembly comprising an in-vehicle charging station according to claim 1 and an electrically heated aerosol-generating device, the aerosol-generating device being configured for receiving an aerosol-generating article and further comprising an electrical heater for heating an aerosol-forming substrate of the aerosol-generating article to form an aerosol, and an electrical power supply for supplying electrical power to the electrical heater.

14. A vehicle comprising an in-vehicle charging station according to claim 1, wherein the charging station is stationary arranged in the vehicle.

15. The vehicle according to claim 14, wherein the charging station is arranged in a dashboard, a center console, an arm-rest, an ashtray recess, a change-tray recess or a cup-holder recess of the vehicle.

16. A vehicle comprising an in-vehicle charging station according to a charging assembly according to claim 13, wherein the charging station is stationary arranged in the vehicle.

* * * * *